April 15, 1952 W. D. MOORE 2,592,942
DUSTPROOF LEVELING SCREW
Filed Nov. 24, 1950
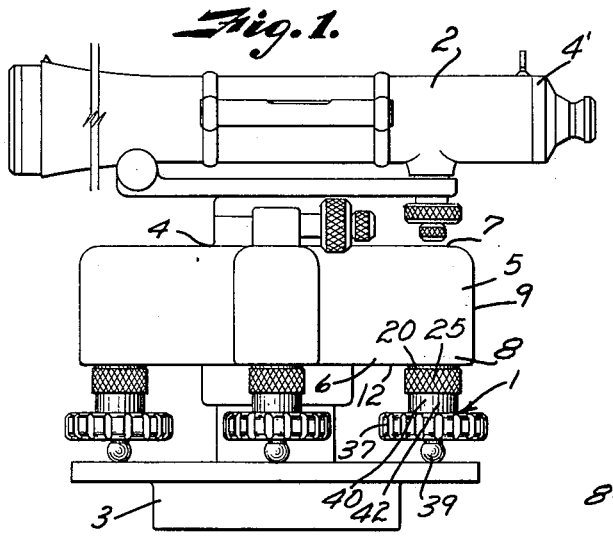
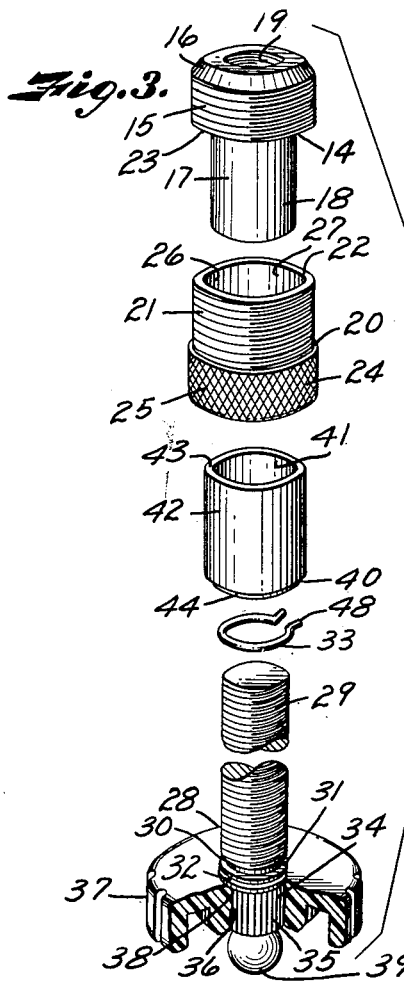
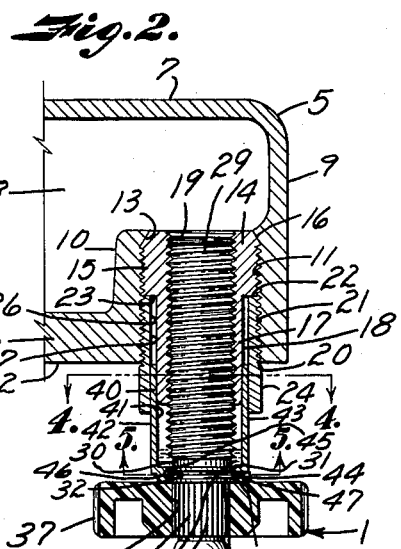
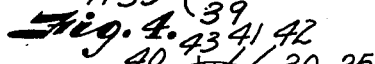
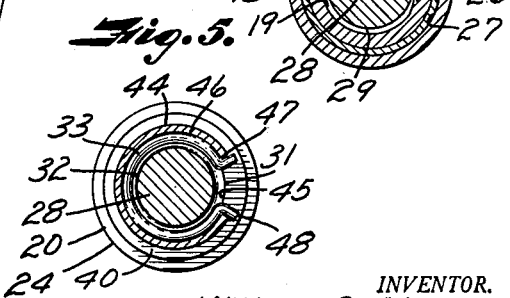
INVENTOR.
William D. Moore
BY
Fishburn & Mullendore
ATTORNEYS Patented Apr. 15, 1952

2,592,942

UNITED STATES PATENT OFFICE 2,592,942

DUSTPROOF LEVELING SCREW

William D. Moore, Kansas City, Mo., assignor to Brunson Instrument Co., Kansas City, Mo., a corporation of Missouri Application November 24, 1950, Serial No. 197,217

4 Claims. (Cl. 287—62)

This invention relates to leveling screws for transits, levels and other instruments in which adjustable leveling means are employed for making the instrument level. More particularly the invention relates to a dustproof leveling screw construction for use on engineers' and surveyors' transits and similar instruments which are used in the field and are subjected to dust, sand, water and other foreign materials which tend to cause excessive wear or otherwise interfere with accurate operation of the instrument.

Surveying instruments such as transits and levels are usually provided with a plurality of leveling screws which must be turned each time the instrument is placed in a new position to accurately adjust the level condition of said instrument for further reading. Excessive looseness or play in the threads of the screws is undesirable as it tends to lead to inconsistent and inaccurate results. Dirt, dust and other foreign material cause excessive wear of the threads and also tend to bind or otherwise interfere with the operation of the screws. It is therefore desirable to enclose or shield the screws from dust and dirt by use of freely moving devices that will not interfere with the operation and accuracy of the adjusting screws.

The objects of the invention are to provide a dustproof level screw construction with cooperating slidably engaged sleeves to enclose said screw; to provide a floating sleeve structure which will freely operate even when there is some lateral play as when the screw wears without causing the sleeves to bind; to provide a dustproof leveling screw structure adapted to contain lubricant which aids in forming a dustproof seal between engaging surfaces and reduces wear of the screw and sleeves; and to provide a dustproof level screw construction which is easy to manufacture, assemble and operate, that is durable and trouble-free and that is easy to remove and clean in the field.

In accomplishing these and other objects of the present invention, I have provided improved details of structure, the preferred forms of which are illustrated in the accompanying drawings, wherein:

Fig. 1 is a side elevational view illustrating leveling screws embodying the features of the present invention incorporated in a surveyor's level.

Fig. 2 is a vertical sectional view of a leveling screw shown mounted in a portion of a leveling head of a surveying instrument.

Fig. 3 is a disassembled perspective view of the dustproof leveling screw structure.

Fig. 4 is a transverse sectional view through the leveling screw on the line 4—4, Fig. 2.

Fig. 5 is a transverse sectional view through the leveling screw on the line 5—5, Fig. 2, particularly illustrating the sleeve keeper thereon.

Referring more in detail to the drawings:

1 designates a leveling screw assembly which is illustrated in Fig. 1 in connection with a surveying instrument 2, such as a level, said instrument including a tripod plate 3 which is usually mounted on the head of a tripod, and a leveling head 4 which supports a spindle that carries a telescope 4' or other instrument. The leveling head as illustrated in Fig. 1 is preferably of cast metal and includes a plurality of arms 5 extending outwardly substantially parallel to and above the tripod plate 3. The arms preferably have bottom walls 6, top walls 7, side walls 8 and end walls 9 forming a closed hollow structure for lightness in weight. An internal boss 10 is arranged in each arm adjacent the end wall 9 and extends upwardly from the bottom wall 6 as illustrated in Fig. 2. A vertically arranged threaded bore 11 extends from the bottom surface 12 of the bottom wall 6 upwardly into the boss 10 and terminates in an inwardly sloping conical seat 13 at the upper end of the boss 10.

A leveling screw nut 14 has an enlarged portion 15 which is externally threaded to fit the threads of the bore 11, said enlarged portion having a tapered upper end 16 adapted to seat on the conical surface 13, whereby the nut may be screwed into the threaded bore 11 into tight seating engagement with said conical surface 13 and form a seal therewith. The threaded, enlarged portion 15 of the leveling screw nut is preferably slightly less than half the length of the threaded bore 11, and extending downwardly from said enlarged portion is a cylindrical shank 17 of reduced diameter which preferably has an accurately machined and polished exterior surface 18. The shank preferably is of such length that it extends below the bottom wall 6 of the arm 5 as illustrated in Fig. 2. The nut 14 is provided with an axial, internally threaded bore 19 extending therethrough, the thread thereof preferably is right-handed and is the adjusting thread of the leveling screw structure as later described.

A sleeve member 20 which forms the upper dust shield of the structure is provided with an externally threaded portion 21, threaded to fit the internal threads of the bore 11, the threaded portion 21 being of such length that when threaded into the threaded bore 11 the upper end 22 of the sleeve will tightly engage the shoulder 23 at the lower end of the enlarged portion 15 of the leveling screw nut to lock the nut in position in the threaded bore 11. The sleeve 20 preferably has a portion 24 extending downwardly from the bottom of the arm 5 as illustrated in Fig. 5, and said portion preferably is provided with a knurled outer surface 25 to facilitate screwing same into the threaded bore 11. The sleeve 20 has a through cylindrical bore 26 which is concentric with and larger in diameter than the shank 17 of the leveling screw nut, said bore 26 providing an accurately machined and polished inner surface 27 in the sleeve 20, said surface being uniformly spaced from the exterior surface 18 of the shank 17.

A leveling screw 28 is provided with a long externally threaded shank 29, which is threaded to fit the thread in the threaded bore 19 of the leveling screw nut, it being important that the fit of the threaded shank 29 and threaded bore 19, which together form the adjusting threads of the leveling screw construction, be accurate to reduce to a minimum any lateral or longitudinal play therein. The threaded shank 29 is longer than the threaded bore 19, as illustrated in Fig. 2, and the leveling screw 28 is provided with a groove 30 at the lower end of the threaded shank 29 to form a collar portion 31, which has a groove 32 substantially midway the length thereof for receiving a keeper ring 33, as later described.

A cylindrical portion 34 of smaller diameter than the collar 31 extends downwardly from said collar and is provided with an externally knurled surface 35, which engages the bore 36 of a leveling screw head or handwheel 37 that is pressed onto the cylindrical portion 34 and into engagement with a shoulder 38 formed by the collar 31 and cylindrical portion 34, the knurling 35 serving to key the head 37 to said cylindrical portion 34. The lower end of the leveling screw 28 has a ball member 29 of smaller diameter than the cylindrical portion 34 whereby the bore 36 of the head 37 will pass thereover in assembling the head to the screw. The ball member 39 rests on the upper face of the tripod plate 3 and serves as a pivot or bearing for the leveling screw in leveling the instrument.

A lower sleeve or shield 40 is cylindrical in shape and has accurately machined and polished internal and external concentric surfaces 41 and 42 respectively on the wall 43 thereof, whereby the wall of said lower sleeve 40 will enter the annular space between the bore 26 of the upper sleeve 20 and the shank 17 on the leveling screw nut 14, the inner surface 41 of the lower sleeve 40 having a close, sliding fit on the external polished surface 18 of the shank 17 and the external surface of the sleeve 40 having a close, sliding fit with the internal polished surface 27 of the upper shield or sleeve 20. The lower end of the sleeve 40 is provided with an internal flange 44, preferably substantially the same length as the collar 31 and the flange 44 is provided with a bore 45 in which loosely fits the periphery of the collar 31. The flange 44 has an internal, annular groove 46 which aligns with the groove 32 in the collar 31 for engagement with the keeper ring 33. The keeper ring is formed of spring wire whereby it resiliently expands into the groove 46 to retain the lower sleeve 40 on the leveling screw. The flange 44 has a slot 47 through which extend terminal ends 48 of the keeper ring, whereby said keeper ring may be compressed to permit removal of the lower sleeve from the screw.

A small quantity of suitable lubricant 49 is preferably placed in the space between the lower sleeve 40 and the leveling screw shank 29 to provide a lubricant for the screw and reduce wear thereof and also to form an additional seal against possible seepage of dirt, dust or the like between the flange 44 and collar 31.

In using a leveling screw construction assembled as illustrated in Figs. 1 and 2, the screw head 37 is grasped by the operator and rotated to screw the threaded shank 29 into or out of the threaded bore 19 as desired to alter the spacing between the respective arm 5 and the upper surface of the tripod plate 3, each of said screws being operated until the telescope 4' is level in all positions. Movement of the screw shank 29 in or out of the threaded bore 19 also moves the lower sleeve or dust shield 40 between the inner surface of the upper shield or sleeve 20 and the outer surface of the shank 17. It is to be noted that the polished inner and outer surfaces of the lower sleeve 40 fit closely the polished outer surface 18 of the shank 17 and polished inner surface of the upper sleeve 40 respectively to form a positive shield which prevents entry of dust, dirt or other foreign material into the enclosure formed by the shields or sleeves and thereby protects the adjusting threads of the threaded shank 29 and threaded bore 19.

While it is substantially impossible for any dust to enter the leveling screw assembly, the conditions may be such, for example large quantities of windborne dust being deposited on the instrument, as to make it advisable to disassemble and clean the leveling screw assembly. In such an event, the entire structure may be disassembled in the field by merely screwing the threaded shank 29 out of the threaded bore 19 and then grasping the ends of the keeper ring 33 to compress same and permit removal of the lower sleeve 40 from the screw. The upper sleeve 20 may be easily unscrewed from the threaded bore 11 and then the leveling screw nut screwed out of said threaded bore 11. All of the parts may then be thoroughly cleaned and reassembled in the arm 5 of the instrument.

It is to be particularly noted that the arrangement of the lower sleeve 40 on the collar 31 is such as to permit relative floating movement between the lower sleeve 40 and the screw 28, whereby there can be some lateral play as when the threads on the threaded shank 29 and threaded bore 19 wear without causing the sleeve members to bind, thereby assuring substantially complete seal against entry of dust and other foreign materials into the screw assembly with any permissible looseness or play in the threads of the leveling screw.

It is believed obvious that I have devised a fully enclosed threaded leveling screw structure which is economical to manufacture, easily maintained and cleaned, that will function to shield the screw threads from dust and dirt without interfering with operation accuracy thereof.

What I claim and desire to secure by Letters Patent is:

1. In a leveling screw construction for surveying instruments and the like, a leveling arm having a substantially vertical bore extending upwardly therein adjacent the outer end thereof, a nut having an enlarged portion removably secured in the upper portion of said bore in the arm, said nut having a depending cylindrical coaxial shank of less diameter than the bore, said nut having a coaxial threaded bore, an upper sleeve removably secured in the arm with one end of said sleeve engaging the nut to lock same in said bore, said upper sleeve having a cylindrical bore concentric with the nut shank and forming an annular space therebetween, a base plate below the leveling arm, a screw having a threaded shank engaging the threaded bore of the nut, means on the screw engaging the base plate, and a lower sleeve on the screw and extending into the annular space between the upper sleeve and nut shank, said lower sleeve having concentric cylindrical internal and external surfaces slidably fitting the external surface of the nut shank and the bore of the upper sleeve respectively to form an adjustable dustproof enclosure for the screw.

2. In a leveling screw construction for surveying instruments and the like, a leveling arm having a substantially vertical threaded bore extending upwardly therein adjacent the outer end thereof, a nut having an enlarged portion provided with a thread engaging the upper portion of said threaded bore in the arm, said nut having a depending cylindrical coaxial shank of less diameter than the threaded bore, said nut having a coaxial threaded bore, an upper sleeve having an externally threaded portion engaging the threaded bore in the arm with one end of said sleeve engaging the nut to lock same in said threaded bore, said upper sleeve having a cylindrical bore concentric with the nut shank and forming an annular space therebetween, a base plate below the leveling arm, a screw having a threaded shank engaging the threaded bore of the nut, means on the lower end of the screw engaging the base plate, means on the screw for rotating same, and a lower sleeve on the screw and extending into the annular space between the upper sleeve and nut shank, said lower sleeve having concentric cylindrical internal and external surfaces slidably fitting the external surface of the nut shank and the bore of the upper sleeve respectively to form an adjustable dustproof enclosure for the screw.

3. In a leveling screw construction for surveying instruments and the like, a leveling arm having a substantially vertical threaded bore extending upwardly therein adjacent the outer end thereof, a nut having an enlarged portion of less length than the threaded bore and provided with a thread engaging the upper portion of said threaded bore in the arm, said nut having a cylindrical coaxial shank of less diameter and extending from the threaded bore, said nut having a coaxial through threaded bore, an upper sleeve having an externally threaded portion engaging the threaded bore in the arm with one end of said sleeve engaging the nut to lock same in said threaded bore, said upper sleeve having a cylindrical bore concentric with and larger than the nut shank and forming an annular space therebetween, a base plate below the leveling arm, a screw having a threaded shank engaging the threaded bore of the nut, means on the lower end of the screw engaging the base plate, a head fixed on the screw for rotating same, and a lower sleeve removably mounted on the screw and extending into the annular space between the upper sleeve and nut shank, said lower sleeve having concentric cylindrical internal and external surfaces slidably fitting the external surface of the nut shank and the bore of the upper sleeve respectively to form an adjustable dustproof enclosure for the screw.

4. In a leveling screw construction for surveying instruments and the like, a leveling arm having a substantially vertical threaded bore extending upwardly therein adjacent the outer end thereof, a nut having an enlarged portion of less length than the threaded bore and provided with a thread engaging the upper portion of said threaded bore in the arm, said nut having a cylindrical coaxial shank of less diameter and extending from the threaded bore, said nut having a coaxial through threaded bore, an upper sleeve having an externally threaded portion engaging the threaded bore in the arm with one end of said sleeve engaging the nut to lock same in said threaded bore, said upper sleeve having a cylindrical bore concentric with and larger than the nut shank and forming an annular space therebetween, a base plate below the leveling arm, a screw having a threaded shank engaging the threaded bore of the nut, means on the lower end of the screw engaging the base plate, a head fixed on the screw for rotating same, a lower sleeve having a lower end loosely engaging the screw adjacent the head, the upper end of said lower sleeve extending into the annular space between the upper sleeve and nut shank, said lower sleeve having concentric cylindrical internal and external surfaces slidably fitting the external surface of the nut shank and the bore of the upper sleeve respectively, a resilient keeper engaging the lower sleeve and screw for retaining the sleeve on the screw, and lubricant in the lower portion of the sleeve forming a dust seal at the screw and sleeve connection.

WILLIAM D. MOORE.

No references cited.